Sept. 30, 1969 W. L. CALVERT 3,469,835
TRANSPORT DEVICE FOR A SHEET OF MATERIAL
Filed Aug. 30, 1967

INVENTOR
WILLIAM L. CALVERT
BY
ATTORNEY

United States Patent Office 3,469,835
Patented Sept. 30, 1969

3,469,835
TRANSPORT DEVICE FOR A SHEET OF MATERIAL
William L. Calvert, Westfield, N.J., assignor to Union Carbide Corporation, a corporation of New York
Filed Aug. 30, 1967, Ser. No. 664,454
Int. Cl. B65h 5/04, 29/46
U.S. Cl. 271—54                5 Claims

ABSTRACT OF THE DISCLOSURE

A transport device for a sheet of material comprising at least one parallel pair of stationary clamps and at least one parallel pair of movable clamps, the latter being located inboard of and immediately adjacent to the former. Each of the stationary clamps has an upper rail and a lower rail, mounted one above the other and separated by a slot sufficient to accommodate the passage of a bag film therebetween. Similarly each of the movable clamps has an upper and a lower rail, reciprocatably mounted one above the other and separated by a slot sufficient to accommodate the passage of a bag film therebetween. The slots between the stationary and movable clamp rails lie in a common plane. Guide means are further provided for permitting longitudinal reciprocatable motion of the movable clamps, and means are disposed in the slots for gripping and releasing the film bag when a portion of the film bag is disposed within the slots. In addition thereto, means is provided to impart reciprocal motion to the movable clamps.

Field of the invention

This invention relates to the automatic manufacture of square-ended, thermoplastic, industrial shipping bags and more particularly to a transport device for accurately indexing the bags-in-process from work station to work station for the sequential performance of the various operations required to form the end of the bag.

Description of the prior art

Previously known transport devices are numerous and varied. Those comprising sets of nip rolls are generally suitable only for transporting a continuous film web in a direction of the longitudinal axis of the bag and do not lend themselves to the performance of identical operations on both ends of the bag simultaneously; those which involve gripping the bag-in-process between endless belt or chains do not maintain rigid positioning of the bag blank during and between indexing motions; and those which involve an indexing turret are more massive, complex, and generally unsuited to the particular bag forming processes involved.

Because of the nature of the operations to be performed upon each end of the bag, the foregoing systems are lacking in many necessary features. For example, there is no provision for the bag-in-process to be indexed linearly in a direction perpendicular to the longitudinal axis of the bag nor is there any provision for accurately positioning the bag-in-process and firmly holding it at each work station, with exactly the correct amount exposed film on each end for the operation to be performed upon it. Furthermore, present day transport systems do not present the finished bag at the final station in a posture adapted to automatic stacking of the bag.

Summary

The present invention provides an apparatus which overcomes all the foregoing drawbacks and at the same time achieves all the desired features enumerated in the preceding paragraph.

Broadly, the present invention provides a transport device for a sheet of material comprising at least one parallel pair of stationary clamps and at least one parallel pair of movable clamps, the latter being located inboard of and immediately adjacent to the former. Each of the stationary clamps has an upper rail and a lower rail, mounted one above the other and separated by a slot sufficient to accommodate the passage of a bag film therebetween. Similarly, each of the movable clamps has an upper and a lower rail, reciprocatably mounted one above the other and separated by a slot sufficient to accommodate the passage of a bag film therebetween. The said slots between the stationary and movable clamp rails lie in a common plane. Guide means are further provided for permitting longitudinal reciprocatable motion of the movable clamps, and, means are disposed in the slots for gripping and releasing the film bag when a portion of the film bag is disposed within the slots. Means to impart reciprocal motion to the movable clamps is also provided.

Description

Figure 1:
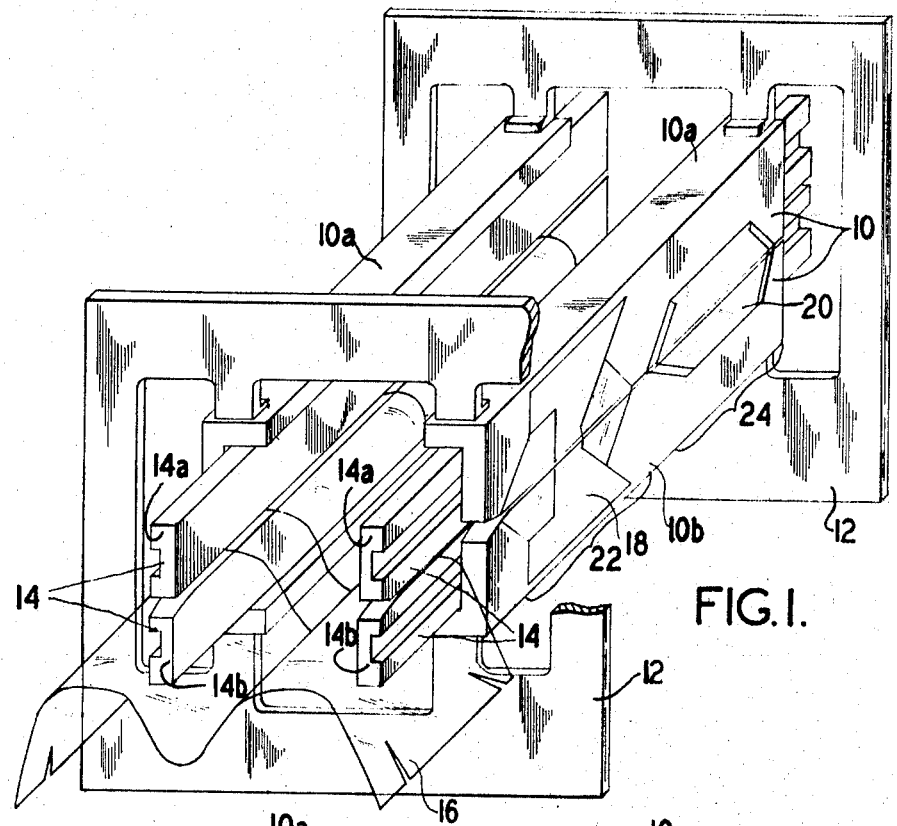
Figure 2:
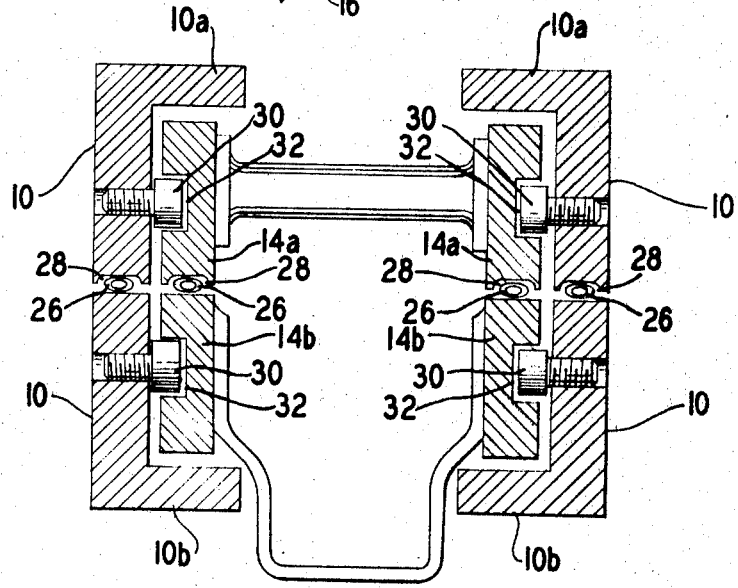

In the drawing:
FIG. 1 is an isometric view of a preferred transport device for a sheet of material in accordance with the present invention illustrating the movable clamps moving upstream to engage a new bag blank.
FIG. 2 is a vertical cross-section of the clamp device of the present invention.

Referring now to the drawing, as shown in FIG. 1, two parallel pairs of stationary clamps 10 are rigidly supported by a support structure 12 (partially broken away). Two parallel pairs of movable clamps 14 are located inboard of and immediately adjacent to the stationary clamps 10. Each pair of stationary clamps 10 has an upper rail 10a and a lower rail 10b, mounted one above the other and spaced apart a vertical distance or slot sufficient to permit free passage of a bag film 16 therebetween. Their length is determined by the number of work stations desired. Similarly, each pair of movable clamps 14 has an upper rail 14a and a lower rail 14b reciprocatably mounted one above the other and separated by a slot sufficient to accommodate the passage of a bag film 16 therebetween. The slots between each set of rails lie in a common plane and the upper movable clamps rails 14a are joined together as a unit and mounted on guide roller 30 (FIG. 2) to permit longitudinal reciprocal motion. The guide rollers 30 are mounted on the stationary clamps rails 10a, 10b and run in side grooves 32 along the movable clamp rails 14a, 14b. The lower movable clamps 14b are similarly joined and guided. In FIG. 1, the movable clamps 14 are shown moving upstream over a new bag blank 16 while the partially formed ends of bags-in-process, 18 and 20, are indicated at the first and second work stations 22 and 24, respectively.

Preferably, as shown in FIG. 2, each upper clamp 10a, 14a is provided with an inflatable rubber tube 26 recessed in grooves 28 in the undersides or face opposing the lower mating rails 10b, 14b. By this means a portion of bag film 16 disposed in the slot between upper and lower clamp rails is firmly gripped when the rubber tube is inflated but free to move when the tube is deflated. The inflatable rubber tubes 26 on the reciprocating movable clamps 14 are inflated and deflated alternately with those on the stationary clamps 10, thereby permitting the alternate moving or holding of the bag blanks as they pass through the transport device. Alternatively, the grooves 28 can be in the undersides or face of the lower clamp rails 10b, 14b as well as in the undersides of the upper clamp rails or in both. Furthermore, the grooves 28 can be eliminated completely if one so desires without detracting from the scope of the invention and if such is the case the rubber tube 26 can be merely firmly stationed on one of the opposing faces instead of being recessed.

While it is preferred to employ the apparatus and method as described above, a number of modifications can be employed without departing from the scope of the present invention. For example, the desired gripping action can be achieved by means other than the inflatable rubber tube. For instance, the clamp rails themselves can be moved together or apart to grip or release the bag; or a series of magnetically or mechanically actuated grippers can be incorporated in upper or lower clamp rails or both. The entire clamp system can occupy any orientation from horizontal; and the right and left hand sets of clamps, rather than having the slots coplanar, are subject to a number of different orientations with respect to each other. The reciprocating motion of the movable clamps can be achieved by cylinders (air or hydraulic), cable, belt, or mechanical linkage.

In addition to variations in form of the invention, a variety of applications are contemplated by the present invention such as the transport of any material, for instance, paper, cardboard, wood, metal, plastic, in sheet or flat tubular form which requires indexing from one position to another. The principles lend themselves to practical applications over a wide range of sizes from fractions of inches to many feet. In addition, the configuration of stationary clamps outboard and movable clamps inboard may be reversed to put the movable clamps outboard of the stationary clamps. A single pair of clamps can be employed instead of two pairs where it is necessary to control only one end of the bag.

What is claimed is:
1. A transport device for a sheet of material comprising:
    (a) at least one parallel pair of stationary clamps;
    (b) at least one parallel pair of movable clamps, each of said movable clamps being located inboard of and immediately adjacent to said stationary clamps;
    (c) said pair of said stationary clamps consisting of an upper rail and a lower rail, mounted one above the other and separated by a slot sufficient to accommodate the passage of a bag film therebetween;
    (d) said pair of said movable clamps consisting of an upper rail and a lower rail, reciprocatably mounted one above the other and separated by a slot sufficient to accommodate the passage of a bag film therebetween, said slots between said stationary and said movable clamps being in a common plane;
    (e) guide means for permitting longitudinal reciprocatable motion of said movable clamps;
    (f) means disposed in said slots for gripping and releasing said film bag when a portion of said film bag is disposed within said slots, and
    (g) means to impart reciprocal motion to said movable clamps.

2. Apparatus according to claim 1 wherein said means disposed in said slots comprises an inflatable tube adapted to grip a portion of the bag film disposed in said slot when said tube is inflated and adapted to allow the bag portion to move freely when said tube is deflated.

3. Apparatus according to claim 1 wherein said transport device comprises two parallel pairs of stationary clamps and two parallel pairs of movable clamps.

4. Apparatus of claim 3 wherein said film bag is thermoplastic polymeric material.

5. Apparatus according to claim 3 wherein means is provided to impart synchronized reciprocal motion to said movable clamps.

References Cited

UNITED STATES PATENTS 3,155,217  11/1964  Cross _____ 198—19

EDWARD A. SROKA, Primary Examiner

U.S. Cl. X.R.

271—84